(12) United States Patent
Hawkes

(10) Patent No.: US 10,941,022 B2
(45) Date of Patent: Mar. 9, 2021

(54) GRABBING DEVICE

(71) Applicant: Darrin Charles Hawkes, Hamilton (NZ)

(72) Inventor: Darrin Charles Hawkes, Hamilton (NZ)

( * ) Notice: Subject to any disclaimer, the term of this patent is extended or adjusted under 35 U.S.C. 154(b) by 123 days.

(21) Appl. No.: 16/063,069

(22) PCT Filed: Dec. 16, 2016

(86) PCT No.: PCT/NZ2016/050199
§ 371 (c)(1),
(2) Date: Jun. 15, 2018

(87) PCT Pub. No.: WO2017/105254
PCT Pub. Date: Jun. 22, 2017

(65) Prior Publication Data
US 2019/0382244 A1 Dec. 19, 2019

(30) Foreign Application Priority Data
Dec. 16, 2015 (NZ) ........................................ 712008

(51) Int. Cl.
| | |
|---|---|
| *B66C 1/58* | (2006.01) |
| *A01G 23/00* | (2006.01) |
| *A01G 23/08* | (2006.01) |
| *B66C 1/42* | (2006.01) |
| *B66C 3/00* | (2006.01) |
| *B66C 3/16* | (2006.01) |
| *B66C 3/18* | (2006.01) |

(52) U.S. Cl.
CPC ............ *B66C 1/585* (2013.01); *A01G 23/003* (2013.01); *A01G 23/08* (2013.01); *B66C 1/425* (2013.01); *B66C 3/005* (2013.01); *B66C 3/16* (2013.01); *B66C 3/18* (2013.01)

(58) Field of Classification Search
CPC ......... B66C 1/585; B66C 1/425; B66C 3/005; B66C 3/16; B66C 3/18; A01G 23/003; A01G 23/08
See application file for complete search history.

(56) References Cited

U.S. PATENT DOCUMENTS 1,717,549 A * 6/1929 Brosius ..................... B66C 3/06
 37/184
3,036,393 A * 5/1962 Baird, Jr. .................. B66C 3/06
 37/184

(Continued)

FOREIGN PATENT DOCUMENTS

| GB | 191111747 A | 12/1911 |
|---|---|---|
| WO | 2012/164464 A1 | 12/2012 |

OTHER PUBLICATIONS

Written Opinion of the International Searching Authority from the Australian Patent Office dated Mar. 20, 2017 for International Application No. PCT/NZ2016/050199.

(Continued)

*Primary Examiner* — Stephen A Vu
(74) *Attorney, Agent, or Firm* — Walter Haverfield LLP; Sean F. Mellino

(57) ABSTRACT

A grabbing device having a plurality of jaws which can be moved between an open position and a closed position to enable the device to grasp an object(s). The technology finds particular application in the forestry industry and moving logs.

20 Claims, 16 Drawing Sheets

(56) References Cited

U.S. PATENT DOCUMENTS

| | | | | |
|---|---|---|---|---|
| 3,102,752 A | * | 9/1963 | Jenkins | B66C 3/04 |
| | | | | 294/111 |
| 3,709,550 A | | 1/1973 | Mitchell | |
| 3,768,853 A | | 10/1973 | Rennie | |
| 3,934,917 A | * | 1/1976 | Paxton | B66C 3/06 |
| | | | | 294/68.23 |
| 4,328,987 A | * | 5/1982 | Zoudlik | B66C 3/12 |
| | | | | 294/111 |
| 5,649,729 A | * | 7/1997 | Peterson | B66C 3/06 |
| | | | | 254/337 |
| 5,653,489 A | | 8/1997 | Fandrich et al. | |
| 2015/0239713 A1 | | 8/2015 | Ward | |

OTHER PUBLICATIONS

International Search Report from the Australian Patent Office dated Mar. 20, 2017 for International Application No. PCT/NZ2016/050199.
International Preliminary Report on Patentability from the Australian Patent Office dated Dec. 21, 2017 for International Application No. PCT/NZ2016/050199.

* cited by examiner

GRABBING DEVICE

CROSS REFERENCE TO RELATED APPLICATIONS

This application is a 371 National Stage application of International Patent Application number PCT/NZ2016/050199 titled "GRABBING DEVICE," filed on Dec. 16, 2016, which claims the benefit of New Zealand Patent Application Number 712008 titled "GRABBING DEVICE," filed on Dec. 16, 2015. The entirety of the above-noted applications are incorporated by reference herein.

TECHNICAL FIELD

The present invention relates to a grabbing device.

BACKGROUND ART

Grabbing devices are known for lifting and moving loads in a number of different industries. For instance, these devices can be used in applications such as moving of logs, particulate material, and dredging. Therefore a variety of grabbing devices are known.

In general, these grabbing devices comprise at least a pair of jaws. The jaws are moved to an engaging position in which a load is grasped by the jaws so as to facilitate its movement. The jaws may also be moved to a release position to disengage the load.

A grabbing device having particular application in the logging industry is described in U.S. Pat. No. 3,709,550.

The device is configured for use with a separate hauling device, such as the arrangement known as a pole yarder. Therefore, the device is configured to be suspended from, and maneuvered by, a high lead grapple yarding arrangement. The grabbing device in the form of a grapple comprises a pair of tongs that can be opened and closed.

The device comprises a plunger which is mounted to a carriage secured to the ropes of the pole yarder. An end of the plunger is mounted within a housing. A pair of tongs are pivotally mounted to the housing. A linkage mechanism is configured to transfer movement of the plunger relative to the housing to the tongs to thereby move the tongs into open and closed positions.

However, the device described in this patent includes a number of inherent disadvantages. For instance, the plunger maybe bent via knocks or other impacts incurred during normal operation. If this occurs, then the plunger is not able to move through the body meaning that the device will not operate.

In addition, the linkage mechanism is complex and fiddly. It is therefore prone to misalignment resulting in the device not operating.

Yet a further disadvantage of the device described in this patent is that it must be moved through a full cycle to get to the open or closed positions. In other words, the mechanism cannot be stopped part way through an opening or closing operation. This can be problematic if the jaws have missed a target load. Accordingly, the device can be awkward to use.

Furthermore, the device requires gravity to cause the plunger to move downwards towards the jaws so that the linkage can transfer the mechanism to move the jaws into the open or closed positions. As a result, the operation of the device can be affected if it is not orientated substantially vertically. That can provide problems for operation of the device.

Even if a biasing means were provided to force the plunger down, it would likely reduce the gripping force of the jaws—thereby reducing the effectiveness and usefulness of the device.

As a result, it would be an advantage to have a grabbing device which addresses any or all of the foregoing problems.

Furthermore, it would be an advantage to have a grabbing device which includes less moving parts than those described in the prior art.

It would also be an advantage to have a grabbing device with a less complex and/or reliable mechanism to move jaws between open and closed positions, and secure them in those positions.

Yet a further object of the present invention is to provide a grabbing device that can be used suspended from and operated by hauling devices using a single length such as a log yarding system without interlocking drums. Alternatively, it is also an object of the invention to provide a simpler design for a grabbing apparatus.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention there is provided a grabbing device, including
a first body;
a length of material having a first end, a second end, and a middle section in between the first end and the second end, wherein the length is flexible;
wherein the first end of the flexible length is fixed to, or configured to be connected to, a hauler;
a second body providing an axle;
wherein the flexible length extends around the axle and is fixed to the first body at or towards the second end;
a brake moveable between:
   a locking position in which it prevents the middle section of the flexible length moving with respect to the first body to hold the amount of the flexible length between the first end and the brake constant, and
   a release position in which it allows the middle section of the flexible length to move with respect to the first body to allow the amount of the flexible length between the first end and the brake to change;

a first jaw and a second jaw that are each mounted to be moveable between an open position and a closed position.

The present specification describes improvements to grabbing devices, and more particularly, grabbing devices for use in the forestry industry.

In an embodiment, the grabbing devices according to the invention are used to engage one or more logs, so as to facilitate lifting and/or moving of the logs. Reference will be made herein accordingly. However, this should not be seen as limiting on the scope of the present invention. It is also envisaged that the grabbing device can be utilised with lifting any object such as particulate material e.g. gravel or dirt, or as a dredging bucket. As a result, the discussion herein should not be seen as limiting on the scope of the present invention.

Throughout the present specification reference to the term "flexible length of material" should be understood as meaning a length of material which is able to change its shape. This may be by flexing, bending, twisting, or other movement in three dimensions.

In an embodiment, the flexible length is substantially inextensible along its length. Reference will be made herein to the length of material as a flexible length.

In an embodiment, the flexible length may be a chain. The chain is formed from a plurality of links, which may each be pivotally secured to at least one adjacent link along the length of the chain. This is as should be understood by one skilled in the art.

Each link includes a cavity or recess configured to receive a tooth on a cog having a corresponding shape.

However, it is also envisaged that the flexible length can take other forms such as being a wire rope or a reinforced plastic cable. As a result, the discussion herein should not be seen as limiting on the scope of the present invention.

Reference herein will be made to the term "hauler". This should be understood as meaning any device or arrangement to lift, lower, and/or otherwise move the grabbing device.

In an embodiment, the hauler may be a yarding arrangement (or pole yarder) as should be known to one skilled in the art. The yarding arrangement comprises at least one cable suspended from a plurality of supports. The hauler is configured to feed the rope between the supports, to thereby change the position of the grabbing device. This will be discussed in more detail below.

However, it is also envisaged that the hauling device can take other forms such as being a crane, digger, or other lifting means. For instance, the grabbing device could be secured to an arm of an excavator digger. This may be a direct connection. Alternatively, the connection may be via a rope mounted to a winch. The winch is configured to feed out or draw in the rope so as to change the separation between the grabbing device and the end of the arm. Therefore, the winch is configured to facilitate raising and/or lowering the grabbing device.

In addition, the excavator is configured to move and change the orientation of the arm, thereby also facilitating movement such as raising and/or lowering of the grabbing device.

In an embodiment, the first end of the chain is configured to be secured to a hauler. For instance, the first end may include a fastener half, configured to engage with a complementary fastener half of a yarding apparatus.

Alternatively, the first end may be wrapped around a winch or pulley system forming part of the hauler. In-use, the grabbing device is configured to move the first end such as by rotation of drums forming part of the winch. As a result, the discussion herein should not be seen as limiting on the scope of the present invention.

Reference will be made herein to "providing an axle". The axle may be provided in a number of different forms according to applications in which the grabbing apparatus may be used and/or design preferences.

In an embodiment, the axle may be provided to, and secured within, a second body forming part of the grabbing device.

Alternatively, the axle may be provided as a separate component which provides the second body. In this embodiment, first and/or second jaws of the grabbing device are pivotally mounted directly to the axle.

Throughout the present specification reference will be made to the term "axle". This should be understood as meaning a body around which the chain may be at least partially extend around and with respect to which the chain can move.

In an embodiment, the axle may include a cog. The cog may include teeth having a complimentary shape to channels or cavities in the links forming chain.

However, the axle may be a member, rotatably mounted bearing or other axle arrangement. Therefore, the discussion herein should not be seen as limiting.

Reference throughout the preset specification will be made to the term "first jaw" and "second jaw".

This should be understood as meaning at least two components that interact with each other so as to engage an object and thereby secure the object with respect to the grabbing device. In a preferred embodiment the first jaw and the second jaw may be provided in the form of a pair of arms e.g. each arm acts as a jaw.

However, the first jaw and/or second jaw may also be provided in the form of a complimentary bucket-half. In-use at least one of the bucket-halves defines a cavity that can receive particulate materials. However, the first and/or second jaws interact to hold particulate materials within the cavity when in the closed position.

As a result, the foregoing should not be seen as limiting on the scope of the present invention.

Reference throughout the present specification will be made to the term "brake". This should be understood as meaning a device to prevent or allow movement of the chain with respect to the first body.

In an embodiment, the brake may be a band type brake.

Alternatively, the brake may be provided by a cog having one or more teeth that can engage the links forming the chain (or gaps therein). A mechanism is provided to selectively allow or prevent rotation of the cog with respect to the body.

However, the foregoing should not be seen as limiting on the scope of the present invention. It is also envisaged that the brake may be provided by a ratchet and/or pawl arrangement, a clamp-style arrangement whereby the chain is engaged between a pair of opposing clamping portions, a hydraulic arrangement where a non-compressible fluid must flow to allow movement and prevention of fluid flow stops movement, or any other brake.

In an embodiment, the present invention includes a remote control.

In an embodiment, the remote control may be configured to enable an operator to remotely control operation of the grabbing device. For instance, the remote control may enable an operator to remotely engage or disengage the brake so as to be moved between the locking position and the release position.

In addition, the remote control may be configured to control other functions and/or operation of the grabbing device.

For instance, the remote control maybe configured to operate an adjustment mechanism of the grabbing device. Accordingly, the foregoing should not be seen as limiting on the scope of the present invention.

Throughout the present specification, reference to the term "adjustment mechanism" should be understood as meaning an assembly to rotate and/or tilt the grabbing device.

In an embodiment, the adjustment mechanism may include at least one rotating means, and/or at least one tilting means.

The rotating means is configured to rotate the grabbing device around an axle. The tilting means is configured to adjust the orientation of the grabbing device with respect to the horizontal. Thereby, the rotating mechanism and/or tilting mechanism may assist in moving the grabbing device into a desired configuration in which it can engage or deposit a load.

In addition, the remote control maybe configured to control operation of winches and/or hauling devices forming part of a yarding apparatus.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
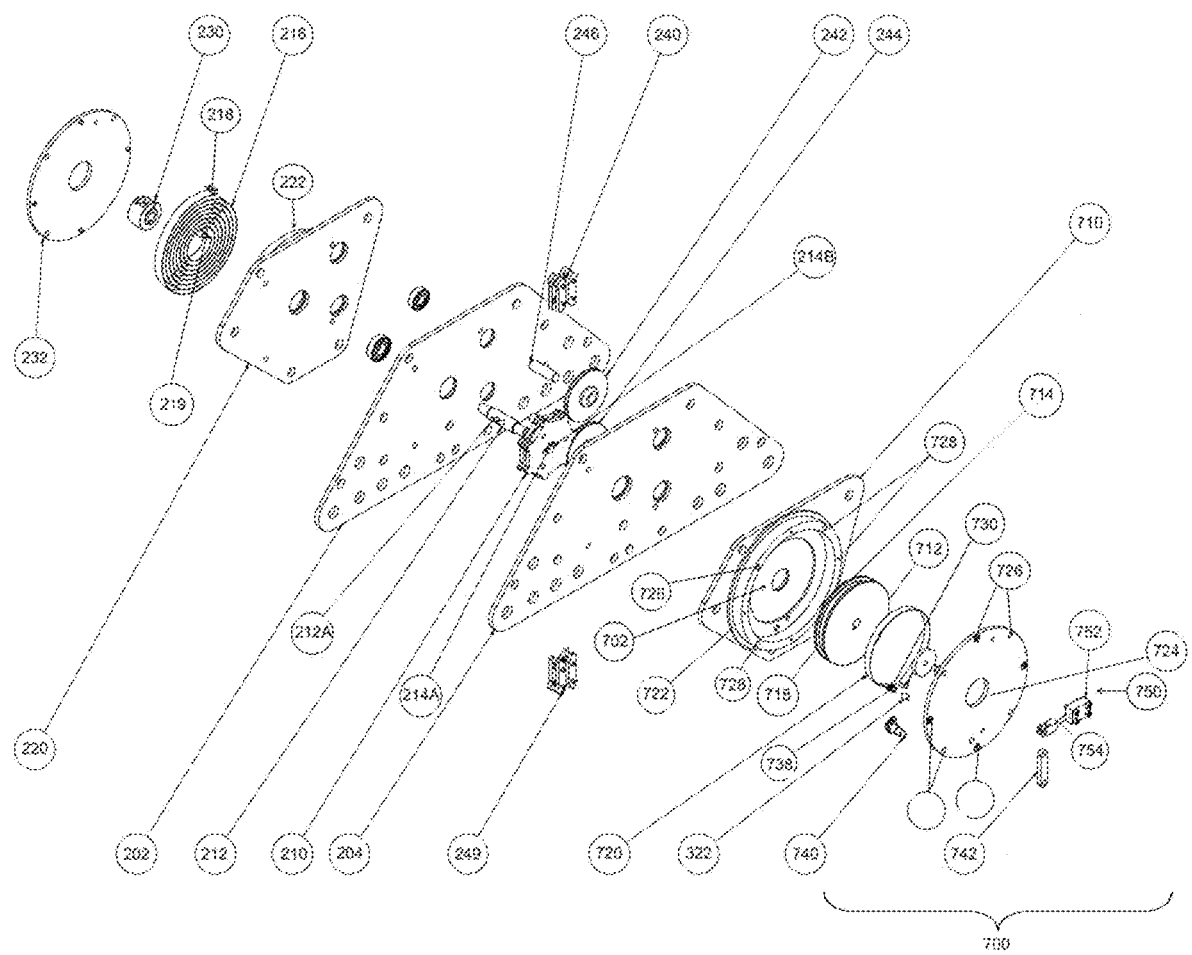
FIG. 1 is a first perspective exploded view of an aspect of the present invention.

Referring first to FIG. 3-6 showing a grabbing device generally indicated as (100). The grabbing apparatus (100) includes a first body (200) and a second body (300).

A first jaw (400) is provided to the second body (300) by being rotatably mounted on an axle (310) that is mounted in the second body (300).

A second jaw (500) is provided to the second body (300) by being rotatably mounted on an axle (320) that is mounted in the second body (300).

Figure 6:
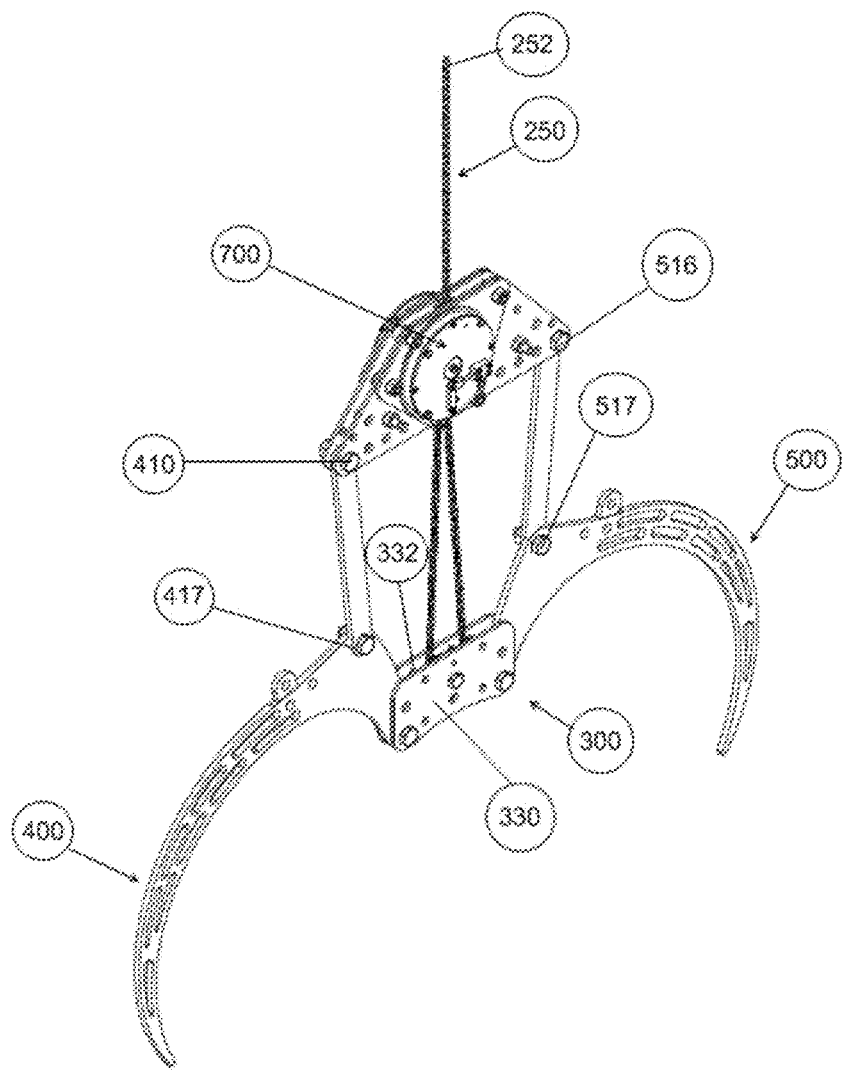
FIG. 6 is a perspective view of FIG. 5.
Figure 7:
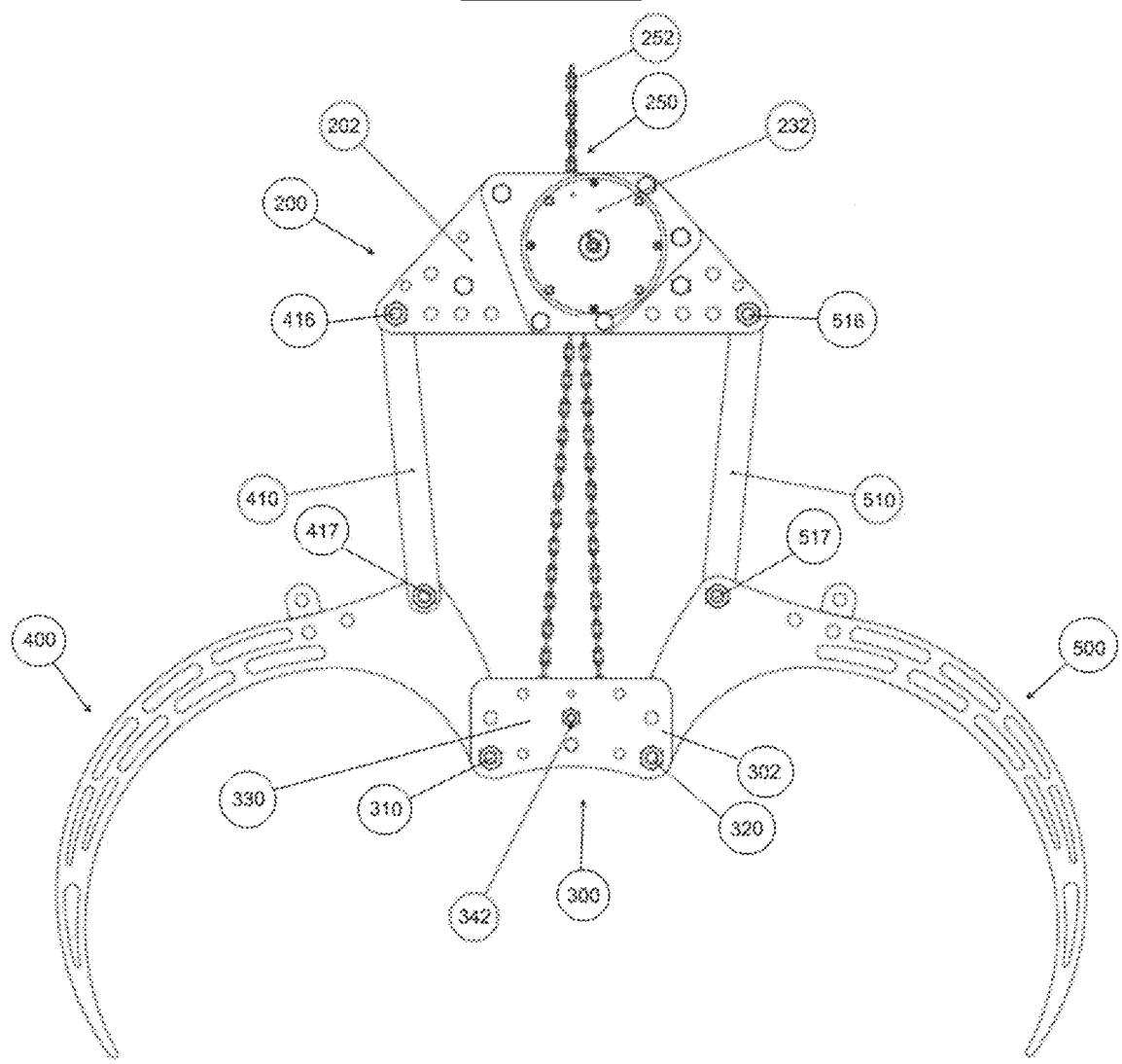
FIG. 7 is a side view of a grabbing apparatus in an open position.
Figure 8:
FIG. 8 is a sectional view of a grabbing apparatus according to one aspect of the present invention in a closed position.
Figure 9:
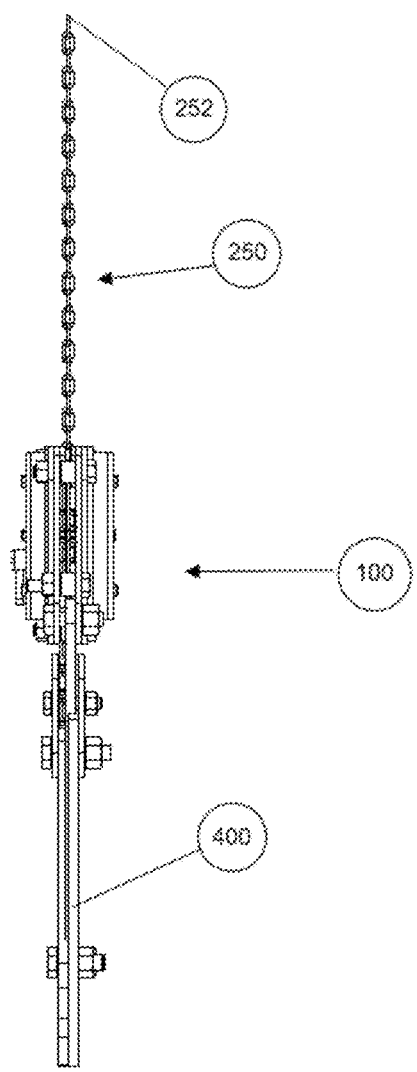
FIG. 9 is a side view of FIG. 8.
Figure 10:
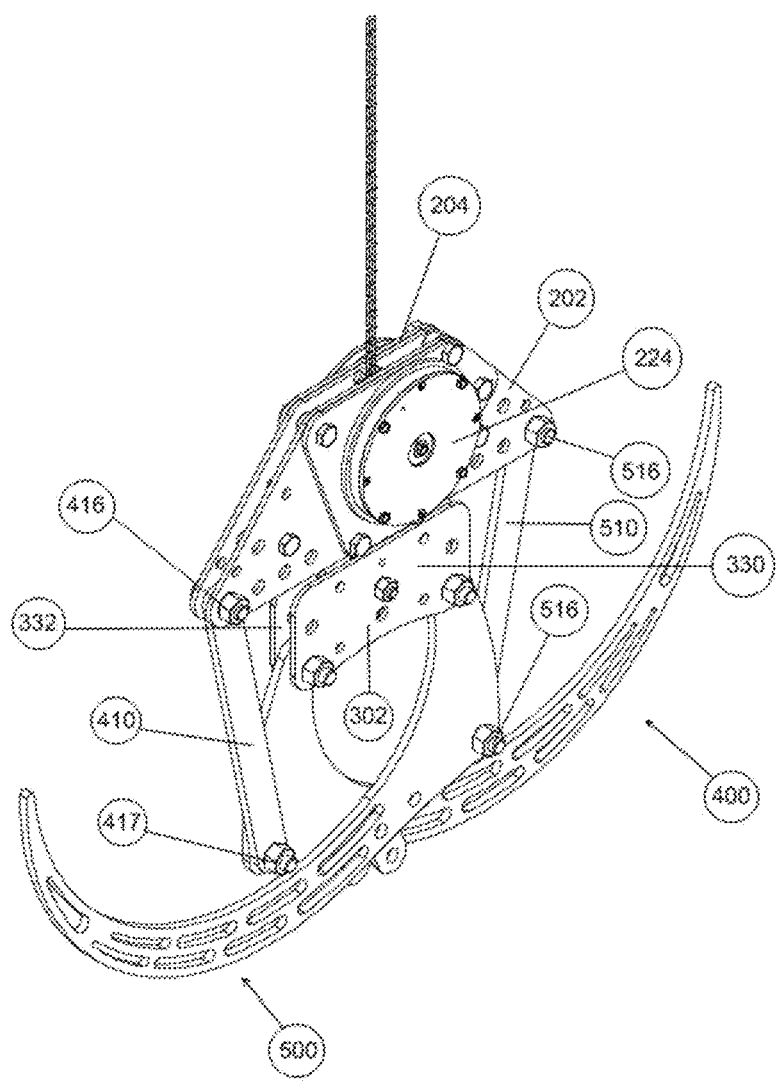
FIG. 10 is a perspective view of FIGS. 8 and 9.

The second body (300) is formed from a first plate (330) and a second plate (332) as are seen in FIGS. 6 and 8.

The axles (310, 320) in combination with other bolts (not shown) act to immovably secure the first plate (330) and the second plate (332) with respect to each other.

A cog (340) is rotatably mounted on axle (342) that is secured between the first and the second plate (332).

A first linkage arm (410) is pivotally secured to the first jaw (400) using an axle (417). In addition, the linkage arm (410) is pivotally secured to the first body (200) using an axle (416).

A second linkage arm (510) is pivotally secured to the first body (200) using an axle (516). In addition, the second jaw (500) is pivotablly secured to the second body (300) using an axle (517).

Figure 2:
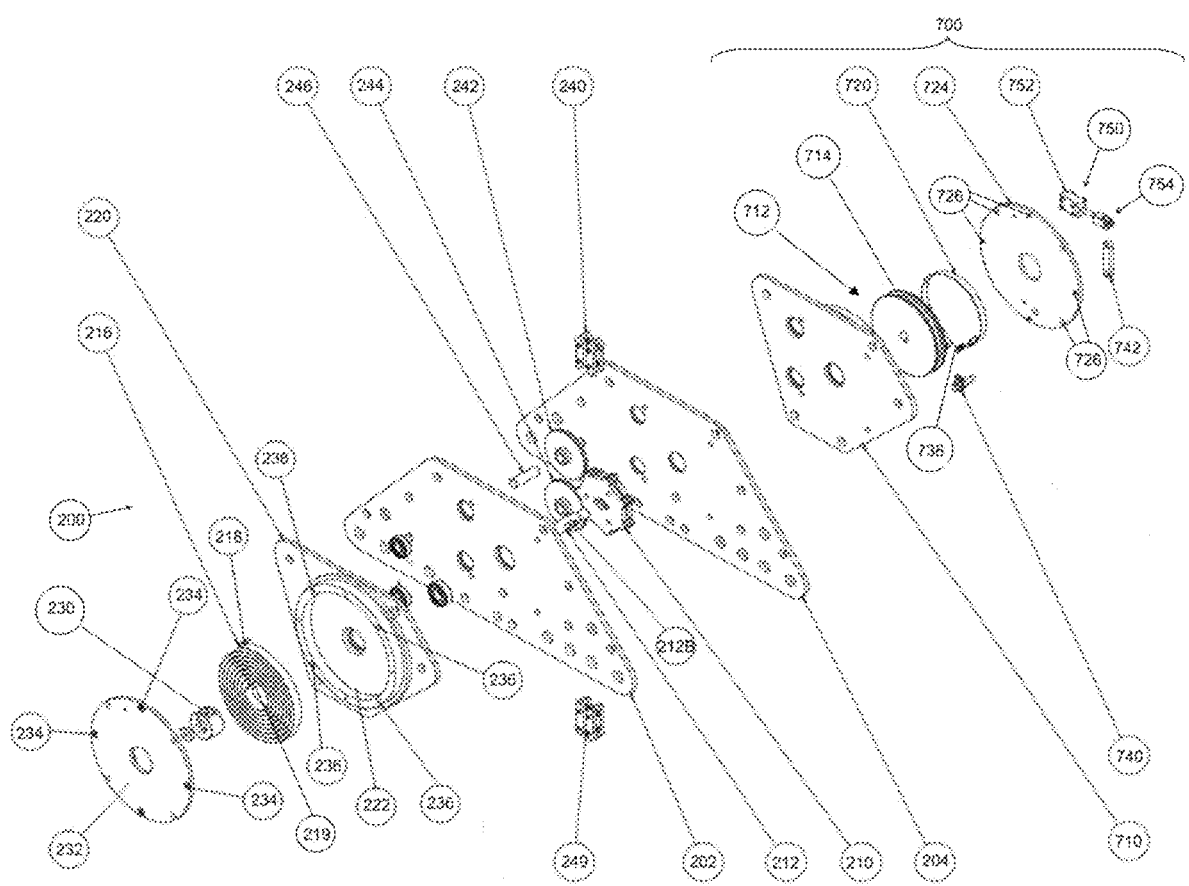
FIG. 2 is a second perspective view of FIG. 1.

Referring now to FIGS. 1 and 2 showing aspects of the first body (200).

The first body (200) is formed from a first plate (202) and a second plate (204). A cog (210) is rotatably mounted between the first plate (202) and the second plate (204) by an axle (212). The axle (212) includes detents (212A, 212B). The detents (212A, 212B) extend in opposite directions, from each other, being positioned on distal sides of the axle (210) from each other.

The detents (212A, 212B) correspond to apertures (214A, 214B) in the cog (210). A spring (216) is mounted to the first body (200) using a mounting plate (220). The mounting plate (220) includes a housing (222) configured to receive the spring (216). An end (218) of spring (216) sits within a notch (not shown in the Figures) in housing (220). Accordingly, the end (218) of spring (216) is prevented from moving relative to the housing (222). However, a second end (219) of the spring (216) is fixed to the bush (230).

The bush (230) is configured to receive and/or rigidly fixed to an end of the axle (212).

A housing closing plate (232) is configured to close the housing (222) so as to secure the spring (216) therein. This may be achieved by screw fasteners (not shown the Figures) which extend through apertures (234) to engage threaded apertures (236) in the housing (222).

A guide (240) is secured in between the first plate (202) and the second plate (204). The guide (240) provides an entrance way into the first body (200).

Figure 3:
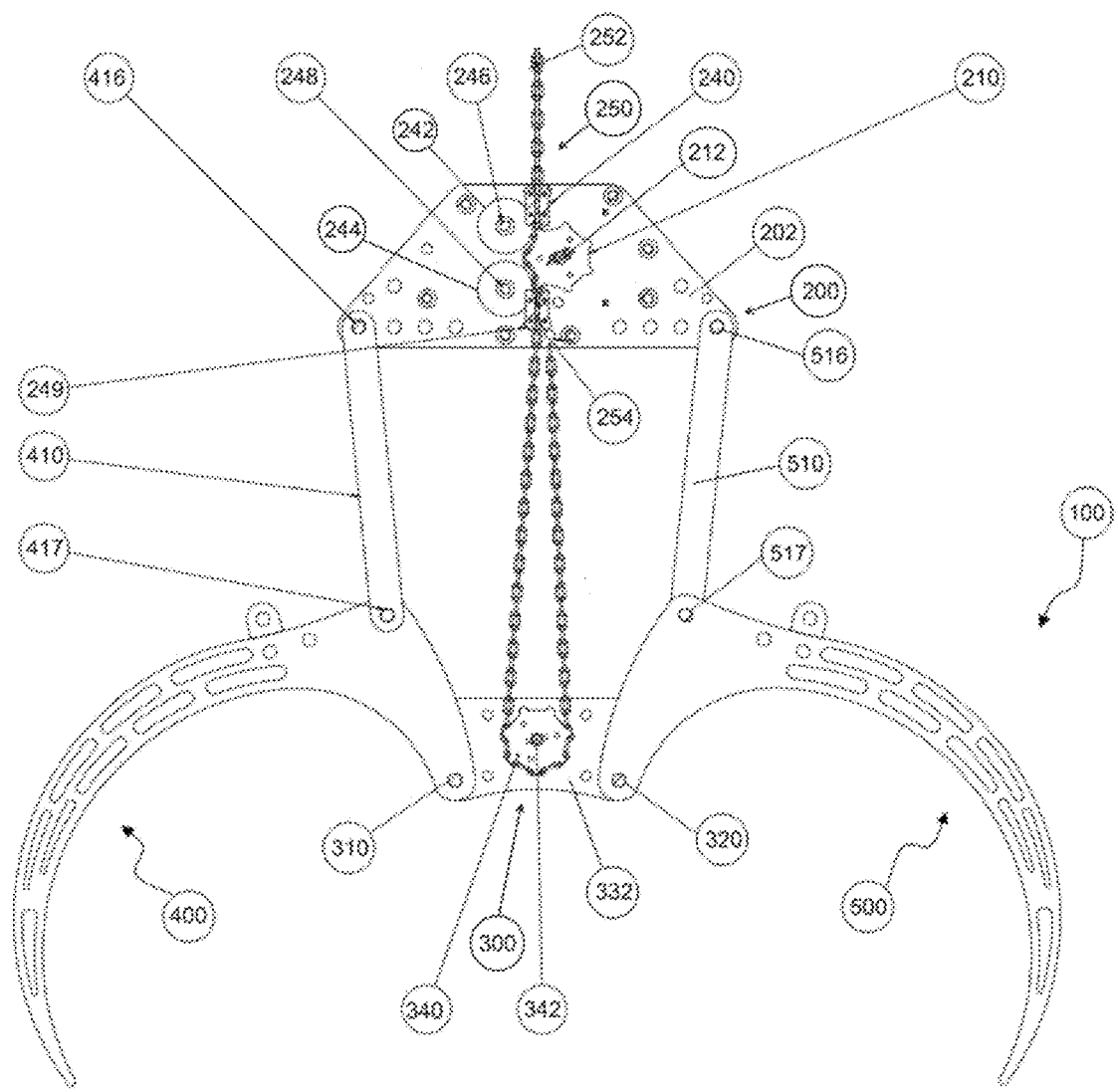
FIG. 3 is a side cross-sectional view of an assembled grabbing device according to one aspect of the present invention in an open position.
Figure 4:
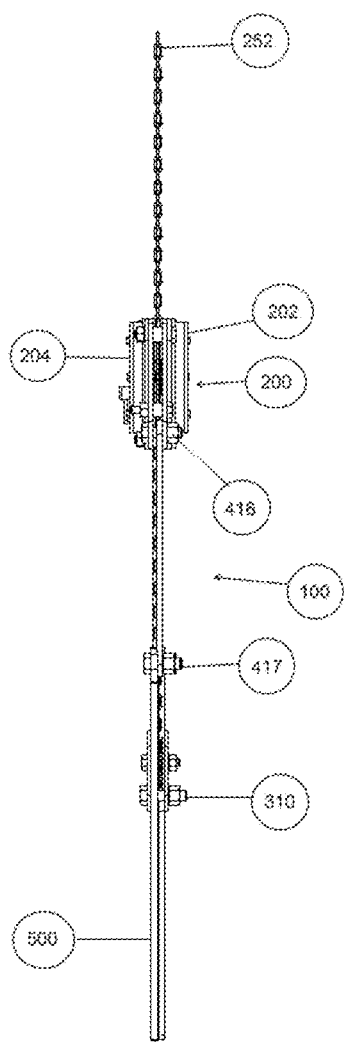
FIG. 4 is a side view of FIG. 3.
Figure 5:
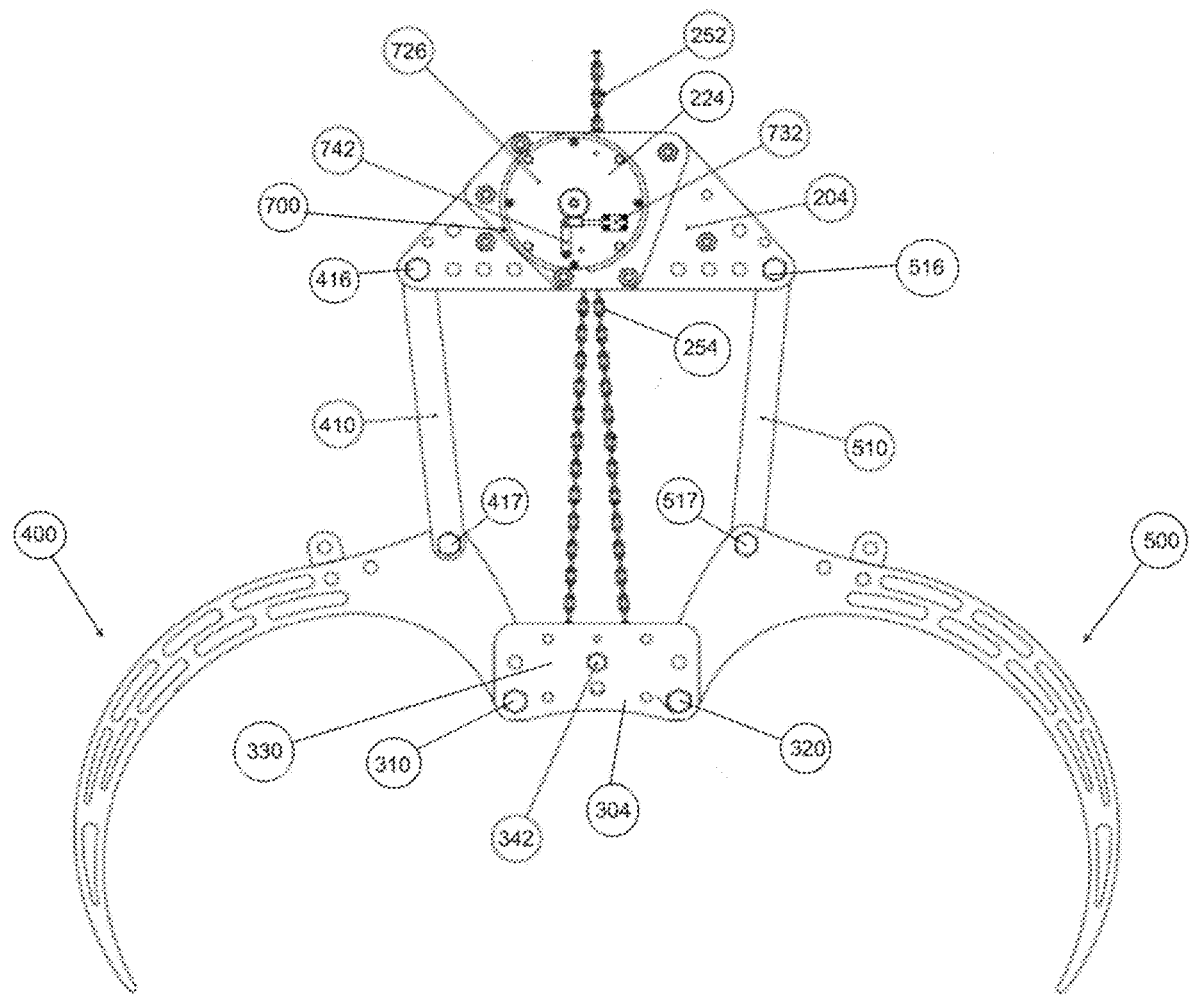
FIG. 5 is a rear view of FIG. 3.

A first roller (242) and a second roller (244) are each mounted in the first body (200) by axles (246) and (248) respectively. The rollers (242, 244) are positioned so as to be adjacent to the cog (210), but are vertically staggered with respect to the cog (210) when the grabbing device (100) is in its normal orientation in use e.g. roller (242) is above roller (244). The orientation and position of the cog (210) and rollers (242, 244) with respect to each other is best shown in FIG. 3.

A second guide (249) is secured in the first body (200) between the first plate (202) and the second plate (204).

A flexible length in the form of a chain (250) is threaded through the first body (200). The chain (250) has a first end (252) and a second end (254). The second end (254) is fixably secured to the first body (200) in between the first plate (202) and the second plate (204) using techniques as should be understood by one skilled in the art such as by a shackle (not shown).

The chain (250) includes a middle section, being a section of the chain (250) between the first end (252) and the second end (254). The middle section of the chain (250) wraps around the cog (210) and extends through the second guide (254) in between the roller, cog (210), and the first roller (246) and the cog (210) and through the guide (246). Accordingly, the second end (254) is outside of the first body (200) as is shown in FIG. 3.

A brake indicated generally as (700) is provided in the form of a drum brake.

The brake (700) includes a drum housing (710) which is connected to the first plate (302) such as by screws, bolts and/or welding.

The drum housing (710) is configured to receive a drum (712). The drum (712) has a recessed shoulder (718) which is stepped in from an outer edge (714). The recessed shoulder (718) is configured to receive a clamping band (720). The clamping band (720) may be made from spring materials such as steel, stainless steel, and/or other resilient materials.

A drum housing closing plate (724) is provided to close the drum housing (710). This is achieved by fasteners (not shown in the figures) which extend though apertures (726) in the drum housing closing plate (724) to engage threaded apertures (728) in the drum housing. A first end (730) of the clamping band (720) is immovably secured with respect to the drum housing (710).

A second end (738) of the clamping band (720) is able to move within the drum housing (710).

The drum (712) is provided to an axle (212) by being fixedly secured thereto. The axle (212) which extends through the drum housing (710) and housing closing plate (724). The drum (712) is fixed with respect to the axle (212). That is, the drum (712) and the axle (212) rotate at corresponding rates to each other. This is achieved by detents (not visible in the figures) on the axle (212) which are disposed within corresponding apertures within the drum (712).

A link (740) is connected to an end (738) of the clamping band (720). The link (740) is connected to an arm (742). The arm (742) is connected to an actuator (750) indicated generally as (750).

The actuator (750) comprises an electric motor (752) and a screw thread drive mechanism (not shown in the figures). In-use, rotation of the electric motor (752) causes a ram (754) to extend or contract linearly. Movement of the ram (754) is transferred to the end (738) of the clamping band (720) via arm (742) and link (740). Thereby, expansion and/or contraction of the actuator (750) can control the tightness of the clamping band (720) around the drum (712). When the clamping band (720) is tightened, it clamps onto the drum (712) to prevent it rotating. When the clamping band (720) is loosened, it releases the drum (712). Thereby, spring (216) can at least partially rotate axle (212).

Figure 11:
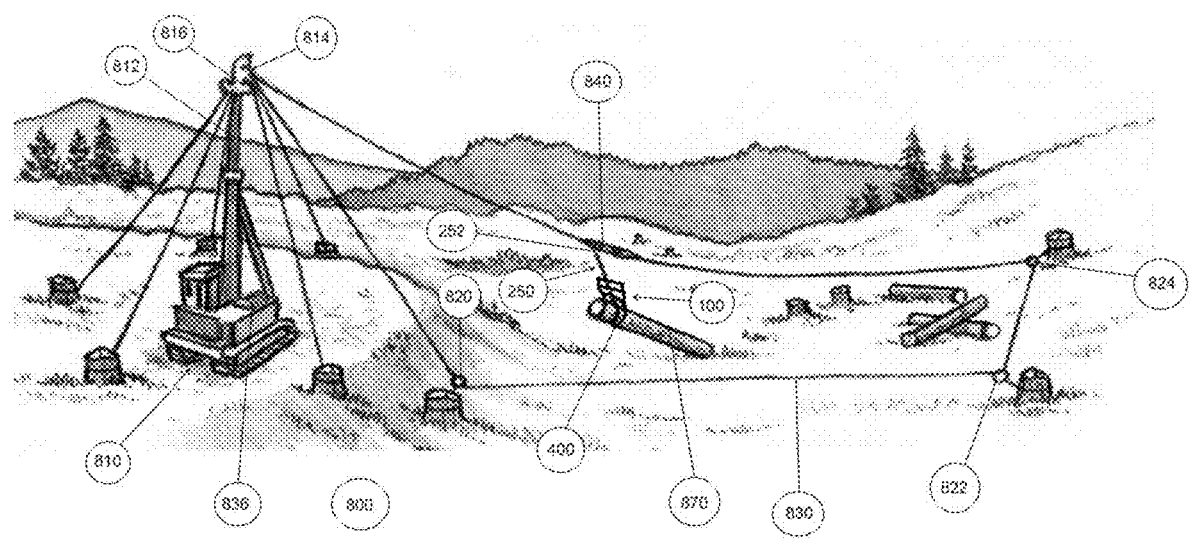
FIG. 11 is a representative view of a yarding arrangement.

Referring now to FIG. 11 showing a yarding arrangement (800) including a grabbing apparatus (100) according to one aspect of the present invention. The yarding arrangement (800) includes a first support indicated by (810) and secondary supports indicated by (820, 822, 824).

The first support (810) is a hauling apparatus in the form of an excavator (811) having a telescopic arm (812).

The excavator (811) may include components to adjust the orientation of the telescopic arm (812).

A drive mechanism is configured to move the telescopic arm (812) with respect to the excavator (811). This is as should be understood by one skilled in the art.

The secondary supports (820, 822, 824) are fixed points such as tree stumps as illustrated. They may also be secondary excavators of rigid posts.

A pulley arrangement (814) is secured to end (816) of arm (812) distal to the excavator (810).

One or more ropes (830) is threaded through the pulley arrangement (814) and in addition, the rope (830) is engaged to winch(es) (836) on the excavator (811). This forms a loop which extends around the secondary supports (820, 822, 824).

A carriage, indicated by (840) is secured to the rope.

The first end (252) of the chain (250) is connected to the carriage (840). This secures the grabbing device (100) to the carriage (840).

In-use, each of the winches (836) is configured to feed out or draw in the rope(s) so as to cause the loop to cycle. The winches (836) may operate individually or concurrently in either direction of rotation. Thereby, the position of the carriage (840) can be adjusted vertically and/or horizontally. As a result, the operation of the winches (836) controls and facilitates movement of the carriage (840) between the arm (812) and the secondary support (824).

The winches (836) are configured to selectively feed out one of the lengths of rope (830). As a result, the height of the carriage (840) can be adjusted. In other words, the hauler (810) and winches (836) facilitate lifting and lowering of the carriage (840).

To engage a load of logs (870) the winches (836) are first used to position the carriage (840), and thereby the grabbing apparatus (100).

The winches are engaged to lower the carriage and thereby the grabbing apparatus (100) so that the jaws (400, 500) come into contact with the logs (870).

An operator (not shown) determines whether the grabbing device (100) is in an open position or a closed position. If in the closed position, then an "opening cycle" may be performed to move the first jaw (400) and the second jaw (500) into the open position to enable them to engage a log (870).

The "opening cycle" involves lowering of the carriage (840) continues until the first body (200) and second body (300) substantially lie on the logs (870) or other surface such as the ground.

Lowering of the carriage (840) is halted.

An operator (not shown) engages remote control (not shown) to move the brake (700) to a release position.

The spring (216) applies an urging force to axle (212) thereby causing it and the cog (210) to rotate. This causes the chain (242) to be fed through the guide (240). As a result, the first end (252) of the chain (250) moves with respect to the brake (700). Accordingly, the middle section, and potentially the first end (252), are fed through the guide (240) and past the brake (700).

The operator uses the remote control to move the brake to an engaged or locking position. The actuator (750) causes the clamping band (720) to tighten around the drum (712). This prevents the axle (212) from rotating.

The winches (836) are engaged to move the carriage (840) upwards (vertically). This causes the first end (252) to move upwards. Because the brake (700) engages the middle section of the chain (250) the first body (200) is also moved upwards.

The chain does not hold the second body close to the first body (200). Rather, the middle section of the chain (250) is able to move around the cog, and the cog (210) rotates around the axle (212). The second body (300) moves away from the first body (200). This causes the jaws (400, 500) to pivot to a release (open) position.

The grabbing device (100) is now in an open position.

The winches (836) are engaged to lower the carriage (840) and thereby also grabbing device (100). The jaws (400, 500) touch one or more logs (870). The brake (700) is moved to a release position and the carriage (840) is raised by the rope loop. The chain moves up through the first body (100) decreasing the length of chain (250) between the first and second bodies (200, 300). This action causes link arms (410, 510) to force the jaws (400, 500) to pivot towards a closed position. The closed position may that in which the jaws (400, 500) touch one or more logs (870) or are completely closed (interlinked) as is shown in FIG. 8

Decreasing the length of the chain (250) between the first and second bodies (200, 300) causes the cog (210) and thereby axle to be moved towards the first body (200). This causes the first jaw (400) to pivot about the axle (412) and second jaw (510) to pivot about the axle (512) to more the jaws into an engaged position.

Forcing the first and second jaws into or towards a closed position may be assisted by the linkage arms (410, 510). That is, the linkage arms (410, 510) assist in forcing the jaws (400, 500) to pivot into or towards a closed position.

The weight of the grabbing device (100) and logs (870) provides force to hold the jaws (400, 500) in a closed position. Therefore, the grabbing strength of the grabbing device (100) is independent of a biasing device or actuators such as hydraulic rams.

The winches (836) can then be used to feed in or out the rope to thereby cause the loop to circulate to move the logs (870) to a desired location.

To release the logs (870) from the grabbing device (100) the winches (836) are engaged so as to lower the grabbing device (100).

This causes the logs (870) to be placed on the ground.

The spring (216) can apply an urging force to axle (212) and thereby causes cog (210) to force the middle section of the chain (250) through the guide (240). This increases the amount of the chain (250) position between the first body (200) and the second body (300).

The operator uses the remote control (not shown) to engage the brake (700). Accordingly, the brake engages the chain (250) between the first end (252) and the second end (254).

The winches (836) are engaged to raise the carriage (840). As the first end (252) is fixed to the carriage (840), it is also raised. This causes the first body (200) to be raised.

The link arms (410, 510) may assist in lifting the second body (300) as the first body (200) is also raised.

The middle section of the chain (250) between the first body (200) and the second body (300) extends around the axle and carries the weight of the second body (300). The axles (412, 512) at which the linkage arms (410, 510) are attached to the first and second jaws (400, 500) are moved upwards.

In this position, the chain (252) may carry the weight of the second body (300).

This causes the first jaw (400) and the second jaw (500) to pivot towards a release (open) position as is shown in FIGS. 3-7.

The above process can be repeated to move additional logs.

First Alternate Embodiment

Figure 12:
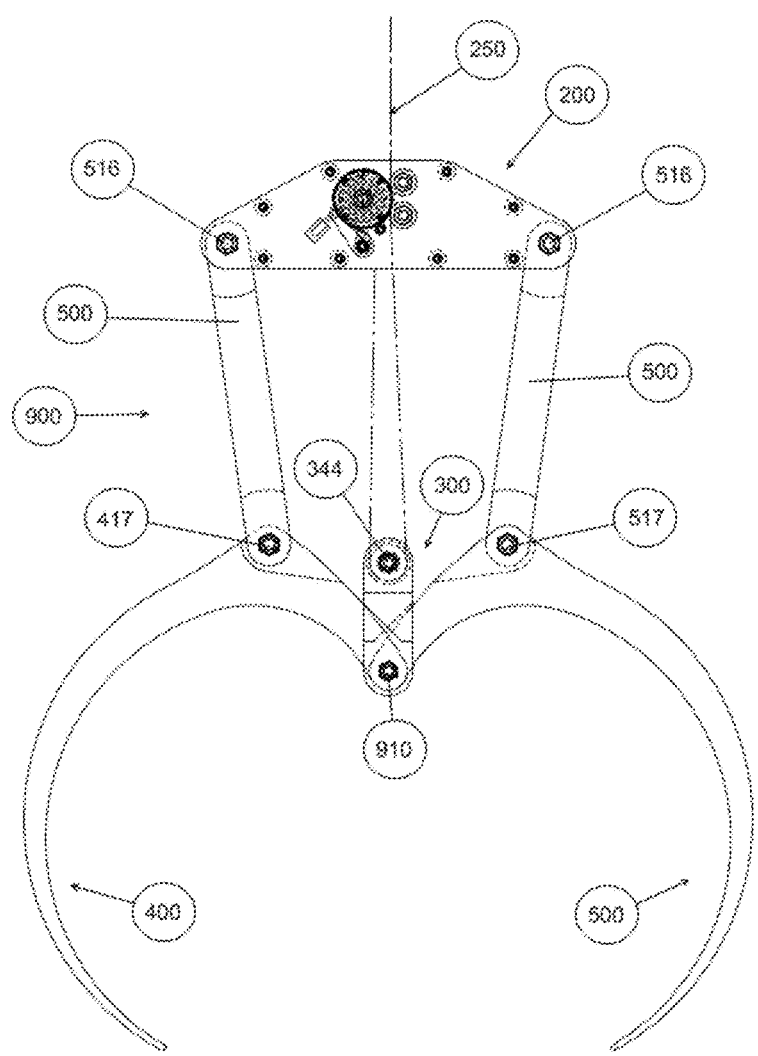
FIG. 12 is a first side view of a grabbing apparatus according to an embodiment of the invention in an open position.
Figure 13:
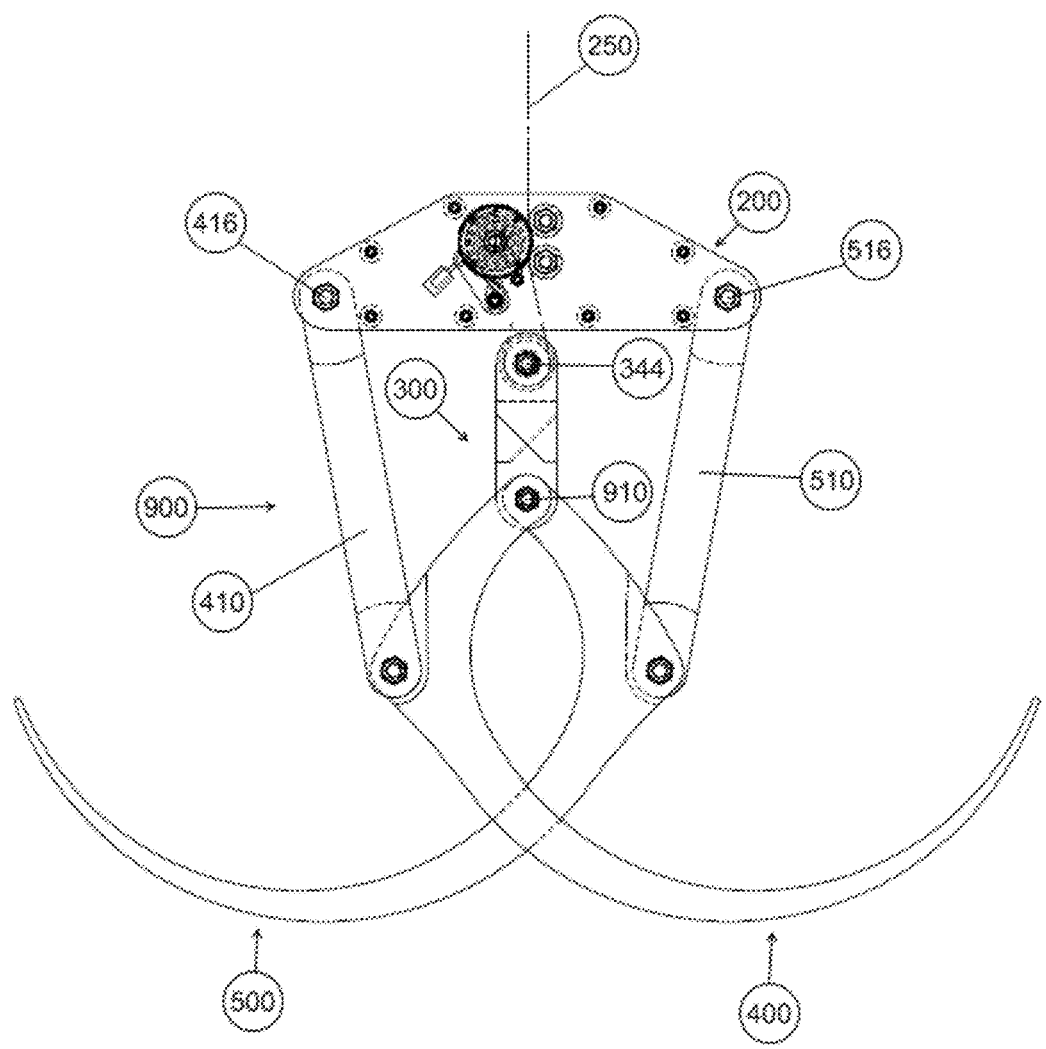
FIG. 13 is a view of FIG. 12 showing a grabbing device according to an embodiment of the invention in a closed position

Referring now to FIGS. 12 and 13 showing a grabbing device (900) according to an embodiment of the invention.

The grabbing device (900) is substantially identical to the grabbing device described above with reference to FIGS. 1-10. Accordingly, like references will be used to refer to like components.

However, the first jaw (400) and second jaw (500) are mounted on the same axle (910). In doing so, the jaws (400, 500) are able to rotate in opposite directions to each other. That is, the first jaw (400) pivots in a clockwise direction, then the second jaw (500) can pivot in an anti-clockwise direction, and vice versa.

The inventor has identified that mounting the first jaw (400) and the second jaw (500) on the same axle (910) may improve the stability of the grabbing device (900) over the embodiment shown and described with reference to FIGS. 1-10.

It should be understood that all other aspects of the grabbing device (900) and its operation is equivalent to operation of grabbing device (100).

Second Alternate Embodiment

Figure 14:
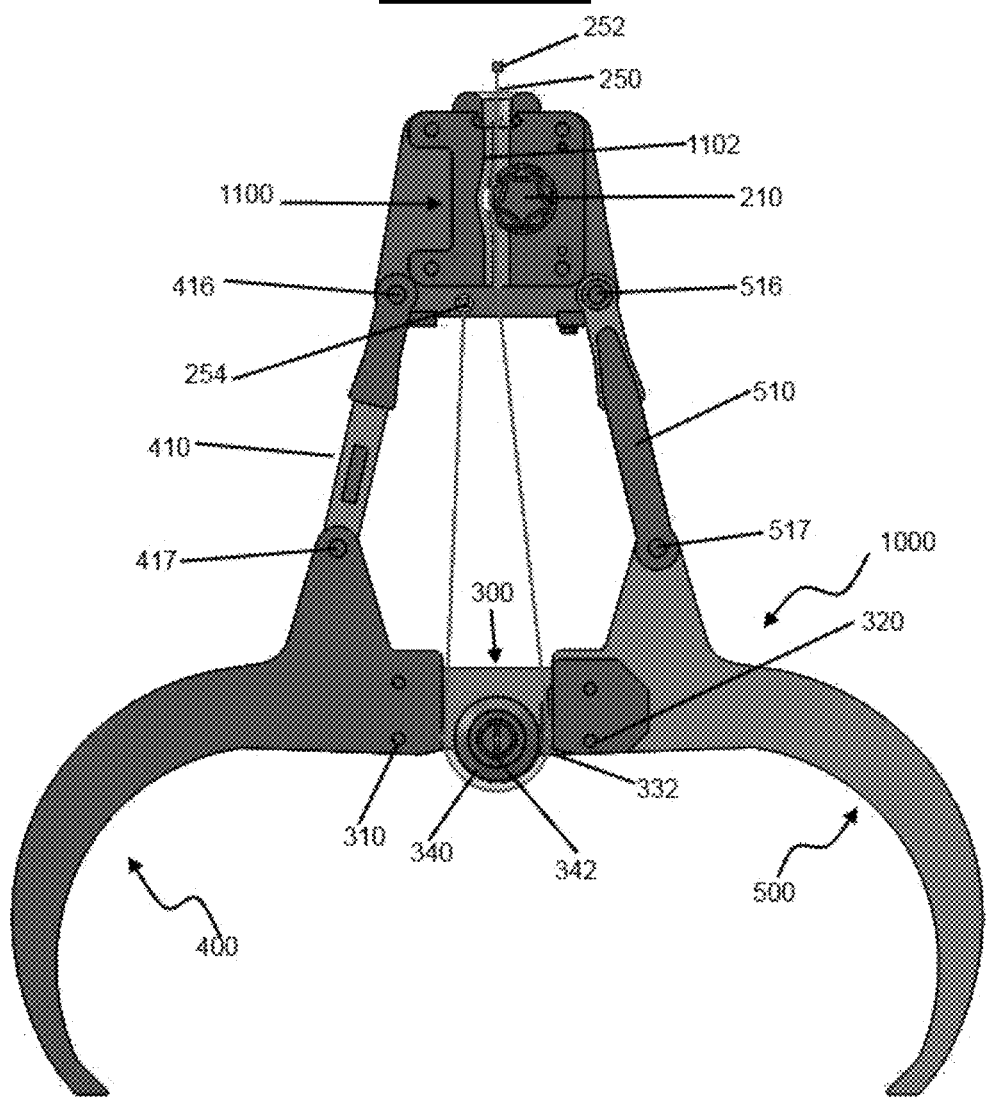
FIG. 14 is a first side cross sectional view of a grabbing apparatus according to an alternate embodiment of the invention in an open position.
Figure 15:
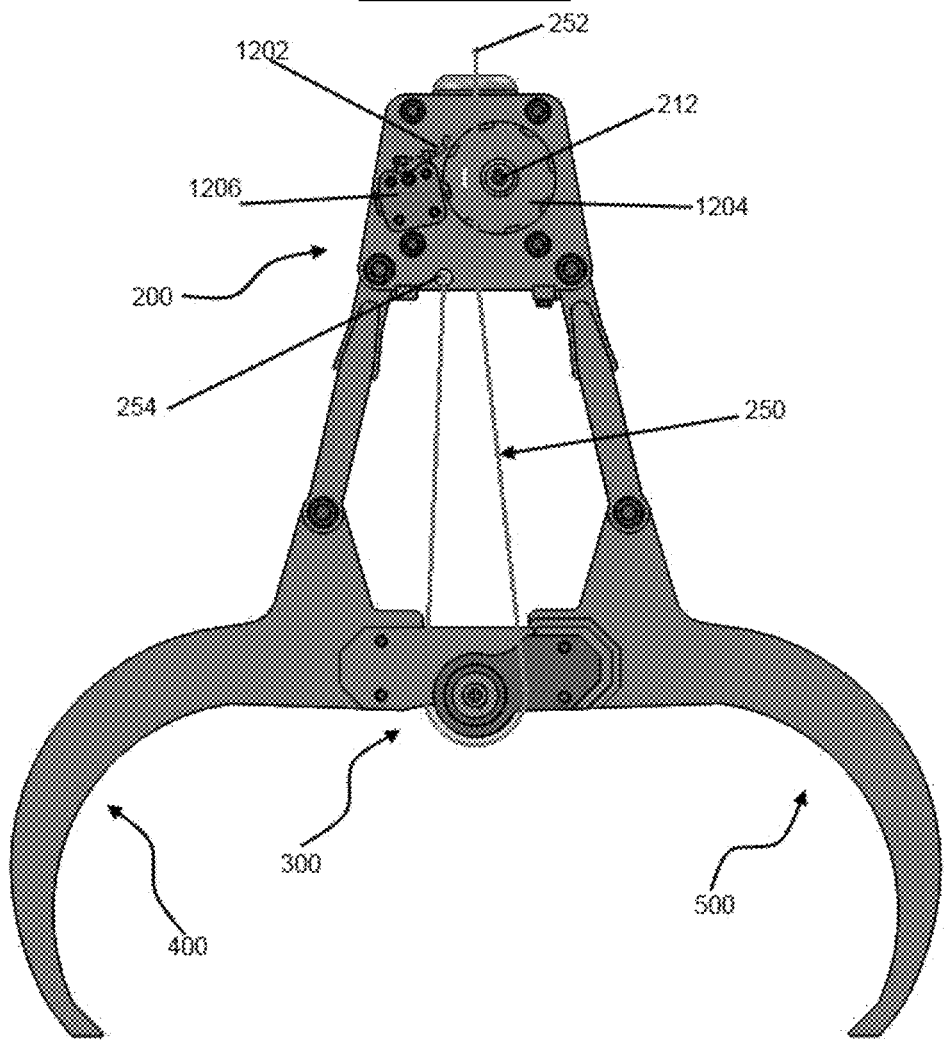
FIG. 15 is a second side cross sectional view of the grabbing apparatus according of FIG. 14.
Figure 16:
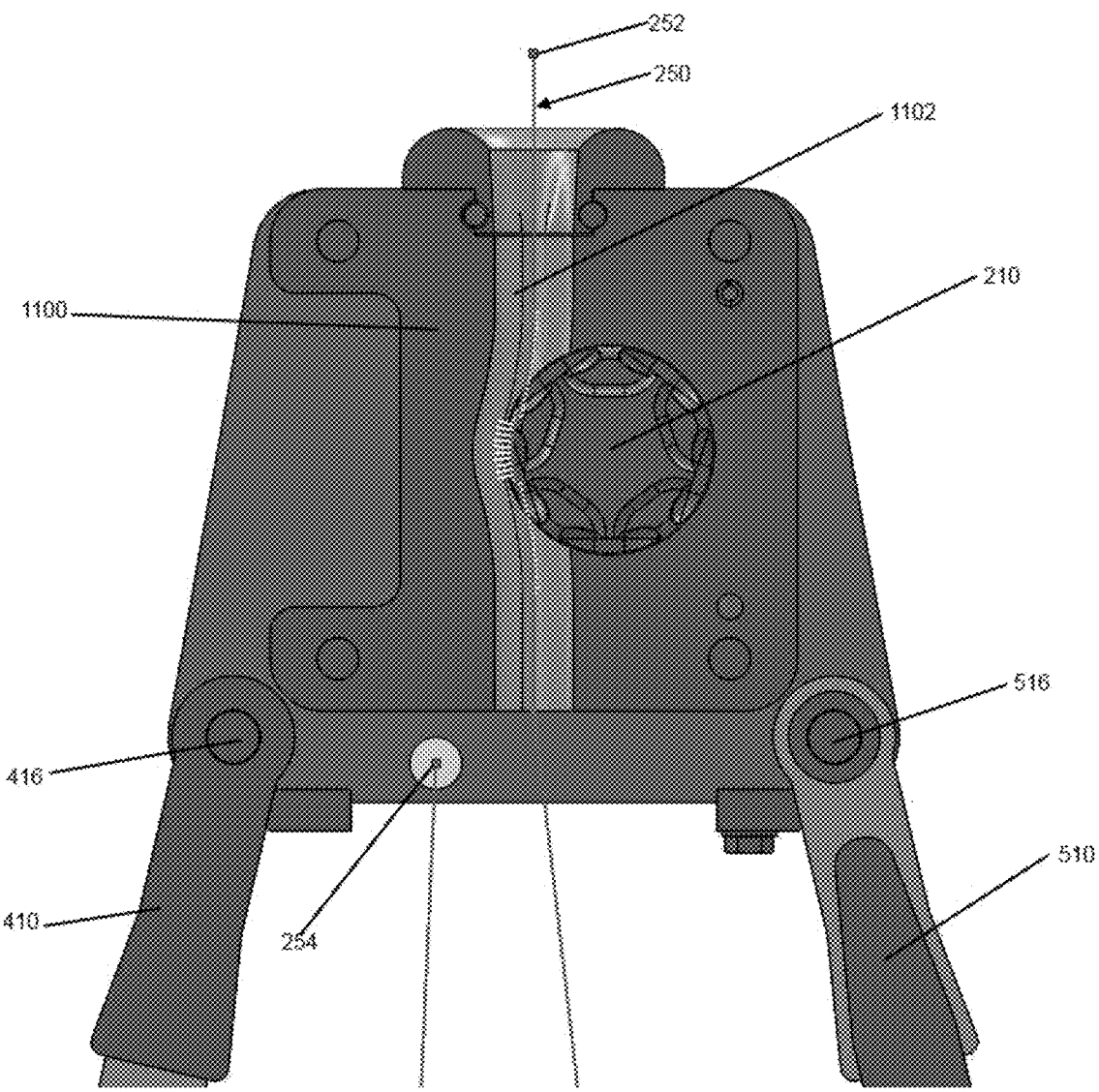
FIG. 16 is a close up view of a section of FIG. 14.

Referring now to FIGS. 14-16 showing a grabbing device (1000) according to an embodiment of the invention.

The grabbing device (1000) is substantially identical to the grabbing device described above with reference to FIGS. 1-10. Accordingly, like references will be used to refer to like components.

In the embodiment of FIGS. 14-16 a chain guide (1100) is mounted in the first body (200). The chain guide (1100) replaces the first roller (242) and the second roller (244) in the embodiment of FIGS. 1-10.

A side edge (1102) of the chain guide (1100) is shaped to define guide surface for the flexible length (250). The guide surface assists to keep the flexible length (250) in contact with the cog (210).

The use of chain guide reduces moving parts and therefore may provide a more reliable grabbing device (1100).

In the embodiment of FIGS. 14-16, a brake (1200) is provided by a locking member (1202) and a cog (1204).

The cog (1204) is fixed to the axle (210) outside the first body portion, adjacent to an outer surface of the first body (200). The cog (1204) includes teeth (unnumbered in the Figures) which define recess or notches between adjacent teeth. The number of teeth and recesses/notches around the circumference of the cog may vary, as may their relative dimensions.

An actuator (1206) is mounted to an outer surface of the first body (200). The actuator is configured to selectively move the locking member (1202) between an advanced position and a retracted position. In the advanced position, the locking member (1202) can engage one of the recesses/notches in the cog (1204). This engagement prevents the cog (1204) rotating relative to the first body. As the cog (1204) is fixed to the axle (212) engagement of a recess in the cog by the locking member also prevents rotation of the axle (212) and therefore movement of the flexible length (250) through the first body (200).

In the retracted position, the locking member (1202) does not prevent rotation of the cog (1204), and preferably does not contact the cog (1204). Accordingly, when the locking member is in the retracted position the cog (1204) can rotate freely.

The locking member (1202) may move linearly or through an arcuate path. For instance, the locking member (1202) may be pivotally mounted to the first body (200). In this embodiment, the actuator (1206) may be a linear actuator which expands and contracts to apply force to the locking member (1202), causing it to pivot about an axis to move between the extended and retracted position(s). The actuator (1206) may be a screw thread mechanism driven by an electric motor, or a hydraulic cylinder and ram.

In contrast, the locking member (1202) may be mounted to the actuator (1206), and linear expansion or contraction of the actuator (1206) moves the locking member (1202) between the extended and retracted position(s).

In addition, it should also be appreciated that the locking member (1202) may be provided by an end of the actuator, and therefore the discussion herein should not be seen as limiting.

Use of a brake as illustrated in FIGS. 14 to 16 provides a number of predefined positions in which the cog (210) can be locked in position.

The actuator (1206) may be in communication with a remote (note shown in FIGS. 14 to 16) to enable an operator to selectively engage the actuator (1206) to move the locking member (1202) between the extended and retracted positions.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

What I claim is:

1. A grabbing device, including
    a first body,
    a flexible length of material having a first end and a second end, and a middle section in between the first end and second end,
    wherein the first end of the flexible length is fixed or configured to be connected to a hauler,
    an arrangement configured to urge the middle section of the flexible length to move with respect to the first body,
    a second body providing an axle,
    wherein the flexible length extends around the axle and is fixed to the first body at or towards the second end,
    a first jaw and a second jaw which in use interact with each other so as to engage an object and thereby secure the object with respect to the grabbing device,
    a brake moveable between:
        a locking position in which the brake prevents the middle section of the flexible length moving with respect to the first body so as to hold the amount of the flexible length between the first end and the brake constant, and
        a release position in which the brake allows the middle section of the flexible length to move with respect to the first body so as to allow the amount of the flexible length between the first end and the brake to change.

2. The grabbing device as claimed in claim 1, wherein the flexible length comprises a chain.

3. The grabbing device as claimed in claim 1,
    wherein the first jaw comprises at least one rigid arm.

4. The grabbing device as claimed in claim 3, wherein the second jaw comprises at least one rigid arm.

5. The grabbing device as claimed in claim 1,
    including a remote control configured to control operation of the grabbing device.

6. The grabbing device as claimed in claim 5, wherein the remote control is configured to engage or disengage the brake.

7. The grabbing device as claimed in claim 5,
    wherein the remote control is configured to control operation of an adjustment mechanism.

8. The grabbing device as claimed in claim 1, including an adjustment mechanism.

9. The grabbing device as claimed in claim 8, wherein the adjustment mechanism includes at least one rotating means.

10. The grabbing device as claimed in claim 8, wherein the adjustment mechanism includes at least one tilting means.

11. The grabbing device as claimed in claim 1,
    including a fastener provided to the first end of the length of material and which is configured to secure the grabbing device to a yarding arrangement.

12. The grabbing device as claimed in claim 1, wherein the brake is a drum brake.

13. The grabbing device as claimed in claim 1, wherein the first jaw and the second jaw are pivotally attached to the first body.

14. The grabbing device as claimed in claim 13, wherein the first jaw and the second jaw are also pivotally mounted with respect to the second body.

15. The grabbing device as claimed in claim 1, wherein the first jaw and the second jaw are configured to move from an engaged position towards an open position as the first body moves away from the second body.

16. The grabbing device as claimed in claim 1, wherein the first jaw and the second jaw are configured to move to a position in which they interact with each other so as to engage an object and thereby secure the object with respect to the grabbing device when the first body moves towards the second body.

17. The grabbing device as claimed in claim 1,
    wherein the connection of the first end to the hauler enables the hauler to raise and lower the grabbing device.

18. The grabbing device as claimed in claim 1, wherein the first body includes a spring which applies an urging force to a cog to rotate to thereby move the middle section of the flexible length to move with respect to the first body.

19. The grabbing device as claimed in claim 1, wherein the first body and second body are mechanically linked to each other.

20. The grabbing device as claimed in claim 1, wherein the brake is located on the first body.

* * * * *